(12) United States Patent
Papas et al.

(10) Patent No.: US 12,466,237 B2
(45) Date of Patent: Nov. 11, 2025

(54) SYSTEMS AND METHODS FOR MITIGATING LEAKING FLAMMABLE REFRIGERANTS

(71) Applicant: B/E Aerospace, Inc., Winston Salem, NC (US)

(72) Inventors: Paul Papas, West Hartford, CT (US); Matthew R Pearson, Hartford, CT (US); Michael T Zimmerman, Newport Beach, CA (US); Brian Mills, Blue Springs, MO (US); Jacob A Spinner, Overland Park, KS (US)

(73) Assignee: B/E AEROSPACE, INC., Winston Salem, NC (US)

( * ) Notice: Subject to any disclaimer, the term of this patent is extended or adjusted under 35 U.S.C. 154(b) by 457 days.

(21) Appl. No.: 17/889,613

(22) Filed: Aug. 17, 2022

(65) Prior Publication Data

US 2024/0059124 A1    Feb. 22, 2024

(51) Int. Cl.
*B64D 13/08* (2006.01)
*B60H 1/00* (2006.01)
*B60H 1/34* (2006.01)

(52) U.S. Cl.
CPC ..... *B60H 1/00871* (2013.01); *B60H 1/00792* (2013.01); *B60H 1/00978* (2013.01); *B60H 1/3421* (2013.01); *B60H 2001/3471* (2013.01); *B64D 13/08* (2013.01)

(58) Field of Classification Search
CPC ........... B60H 1/00871; B60H 1/00792; B60H 1/00978; B64D 13/00; B64D 13/04; B64D 13/06; B64D 2013/0629; F24F 11/36

USPC .......................................................... 454/75
See application file for complete search history.

(56) References Cited

U.S. PATENT DOCUMENTS

| 4,553,407 A | 11/1985 | Rannenberg |
| 5,351,476 A | 10/1994 | Laborie et al. |
| 8,720,217 B2 | 5/2014 | Reed et al. |
| 11,054,171 B2 * | 7/2021 | Andrus ................... F24F 11/32 |
| 2001/0035462 A1 | 11/2001 | Collazo |
| 2016/0363358 A1 | 12/2016 | Papas et al. |
| 2018/0106492 A1 * | 4/2018 | Papas ...................... F24F 11/72 |
| 2018/0327179 A1 | 11/2018 | Papas et al. |

(Continued)

FOREIGN PATENT DOCUMENTS

| EP | 3150943 | 3/2019 | |
| EP | 4012294 A1 * | 6/2022 | ............ F24F 1/0003 |
| WO | WO-2020184333 A1 * | 9/2020 | ............ A62C 2/247 |

OTHER PUBLICATIONS

European Patent Office, European Search Report dated Dec. 21, 2023 in Application No. 23186665.8.

(Continued)

*Primary Examiner* — Allen R. B. Schult
*Assistant Examiner* — William C Weinert
(74) *Attorney, Agent, or Firm* — SNELL & WILMER L.L.P.

(57) ABSTRACT

A leakage protection system for a heating, ventilation, and air condition (HVAC) system can comprise: a power source; a louvered assembly including a frame, slats spaced apart vertically within the frame and extending from a first side to a second side of the frame, an actuator rod operably coupled to the slats, and a spring; a solenoid operably coupled to the actuator rod; and a first pressure switch disposed electrically between the power source and the solenoid.

13 Claims, 5 Drawing Sheets

(56) References Cited

U.S. PATENT DOCUMENTS

| | | | |
|---|---|---|---|
| 2018/0328643 A1* | 11/2018 | Eddy | F25D 11/003 |
| 2018/0347896 A1 | 12/2018 | Eddy et al. | |
| 2019/0170604 A1* | 6/2019 | Kester | G01M 3/226 |
| 2020/0263891 A1* | 8/2020 | Noor | F24F 11/61 |
| 2021/0148611 A1* | 5/2021 | Kumakura | F25B 41/24 |
| 2024/0401827 A1* | 12/2024 | Wada | F24F 11/36 |

OTHER PUBLICATIONS

European Patent Office, European Office Action dated Jun. 27, 2025 in Application No. 23186665.8.

\* cited by examiner

SYSTEMS AND METHODS FOR MITIGATING LEAKING FLAMMABLE REFRIGERANTS

FIELD

The present disclosure relates to heating, ventilation, and air condition ("HVAC") systems, and more specifically to systems and methods for mitigating leaking flammable refrigerants in HVAC systems.

BACKGROUND

With increased fluorinated gas restrictions for using current refrigerants with high global warming potential ("GWP") on aircraft, there is very significant interest in using alternative, low GWP refrigerants such as hydrofluoroolefin ("UFOs") onboard aircraft HVAC systems such as air chillers or small refrigerators. However, low GWP refrigerants can be flammable, which could be potentially harmful if a leak were to occur during operation.

SUMMARY

A leakage protection system for a heating, ventilation, and air condition (HVAC) system is disclosed herein. In various embodiments, the leakage protection system comprises: a power source; a louvered assembly including a frame, slats spaced apart vertically within the frame and extending from a first side to a second side of the frame, an actuator rod operably coupled to the slats, and a spring; a solenoid operably coupled to the actuator rod; and a first pressure switch disposed electrically between the power source and the solenoid.

In various embodiments, the first pressure switch is configured to open in response to an operating pressure in a fluid conduit of the HVAC system falling below a pressure threshold. The solenoid can be de-energized in response to the first pressure switch opening. The louvered assembly can be configured to transition from an open configuration to a closed configuration in response to the solenoid being de-energized. The spring can transition the louvered assembly from the open configuration to the closed configuration in response to the solenoid being de-energized. The actuator rod can be configured to bias the slats into the open configuration during operation of the HVAC system, and wherein the spring is compressed in response to the actuator rod biasing the slats into the open configuration.

In various embodiments, the leakage protection system further comprising a second pressure switch disposed electrically between the first pressure switch and the power source of the solenoid. The first pressure switch can be configured to open in response to an operating pressure falling below a first pressure threshold, and the second pressure switch can be configured to open in response to the operating pressure exceeding a second pressure threshold. The solenoid can be de-energized in response to the first pressure switch opening or the second pressure switch opening.

A heating, ventilation, and air condition (HVAC) system is disclosed herein. The HVAC system can comprise: a housing defining an inlet port; a power source; a plumbing system disposed in the housing, the plumbing system including a fluid conduit configured to flow a refrigerant therethrough during operation, the plumbing system including a condenser disposed proximate the inlet port; a first pressure switch operably coupled to the plumbing system; a first louvered assembly disposed proximate the inlet port; and a first solenoid operably coupled to the first louvered assembly, the first pressure switch disposed electrically between the power source and the first solenoid.

In various embodiments, the HVAC system further comprises a second louvered assembly, wherein the housing further defines an outlet port, and wherein the second louvered assembly is disposed proximate the outlet port. The HVAC system can further comprise a second solenoid operably coupled to the second louvered assembly, wherein the first pressure switch is disposed electrically between the second solenoid and the power source. The first louvered assembly and the second louvered assembly can both be configured to transition from an open configuration to a closed configuration in response to the first pressure switch opening. The first solenoid and the second solenoid can be de-energized in response to the first pressure switch opening. The first pressure switch can be configured to open in response to an operating pressure exceeding a pressure threshold.

The HVAC system can further comprise a second pressure switch disposed electrically between the first pressure switch and the first solenoid and between the first pressure switch and the second solenoid. The first pressure switch can be configured to open in response to an operating pressure falling below a first pressure threshold, and the second pressure switch can be configured to open in response to the operating pressure exceeding a second pressure threshold.

In various embodiments, the HVAC system further comprises a compressor coupled to the fluid conduit, the condenser disposed upstream of the compressor, a heat exchanger disposed downstream of the compressor, and an expansion device disposed fluidly between the condenser and the heat exchanger, wherein a pressure relief device is coupled to the compressor.

A method of operating a leakage protection system is disclosed herein. In various embodiments, the method comprises: biasing, via the leakage protection system, a louvered assembly into an open configuration in response to an operating pressure of a fluid conduit in a heating, ventilation, and air condition (HVAC) system being between a first pressure threshold and a second pressure threshold; closing, via the leakage protection system, the louvered assembly in response to the operating pressure of the fluid conduit falling below the first pressure threshold; and closing, via the leakage protection system, the louvered assembly in response to the operating pressure of the fluid conduit exceeding the second pressure threshold.

In various embodiments, closing the louvered assembly further comprises: de-energizing a solenoid operably coupled to an actuator rod of the louvered assembly; and closing the louvered assembly via a spring in response to the solenoid being de-energized.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
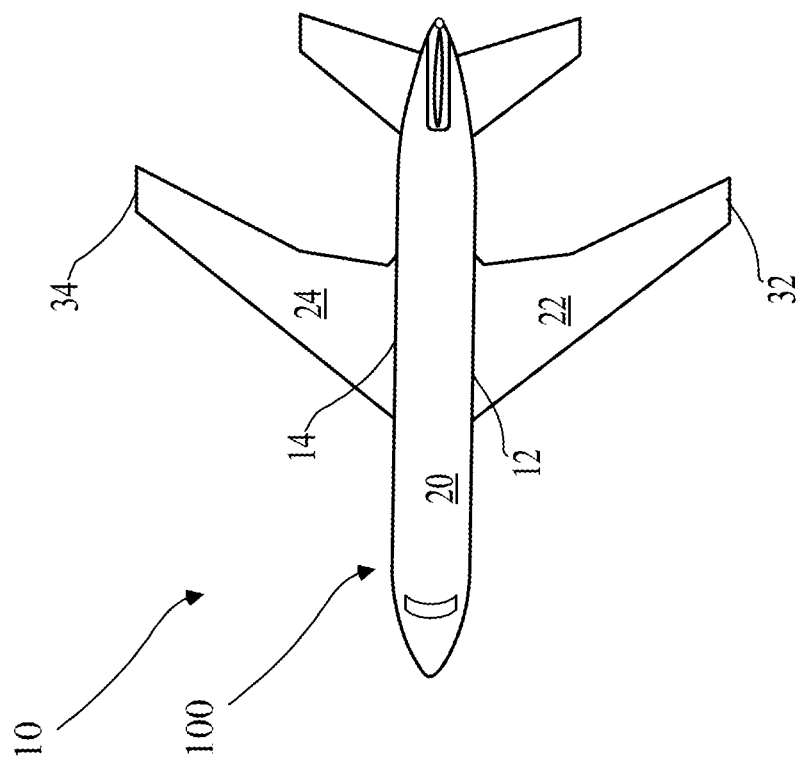
FIG. 1 illustrates a top-down view of an aircraft, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are systems and methods for containing (and/or mitigating) accidental leaks of refrigerants (e.g., flammable refrigerants, such as HFOs) in HVAC systems. In various embodiments, the HVAC system can be for an aircraft. However, the present disclosure is not limited in this regard.

In various embodiments, the system comprises a louvered containment device and a charge isolation valve and/or an emergency pressure relief venting. In various embodiments, the system is configured to prevent refrigerant leakage forming potentially flammable concentrations outside the system when not in operation. In various embodiments, a blow off valve and a shutter system (or systems) at the condenser heat exchanger and/or exhaust ports could be closed. In this regard, refrigerant can be contained in case of a potential failure. During regular operation, installed blowers can readily dilute any potential leaks below flammability limits, in accordance with various embodiments.

In various embodiments, the system disclosed herein can be retrofitted into typical HVAC systems. In this regard, a refrigerant that is flammable can replace typical refrigerants, and the system disclosed herein can easily be retrofitted onto the current system providing leak mitigation protection, in accordance with various embodiments. In various embodiments, the system disclosed herein is passive (i.e., no sensors or electrical control components have to instruct the system to active). In various embodiments, the system disclosed herein does not utilize components that have to be replaced, maintained, and/or are life limited components. In various embodiments, the system disclosed herein does not utilize an auxiliary power source. In various embodiments, the system disclosed herein relies on leakage protection and dilution to below flammable limits in air using existing blowers during start-up/normal operation. The system disclosed herein provides leakage mitigation in response to the system being powered down (or not being in operation).

Referring now to FIG. 1, an aircraft 10 having an HVAC system 100 disposed therein is illustrated in accordance with various embodiments. The aircraft comprises a fuselage 20, wings 22, 24, each wing 22, 24 extending from a root 12, 14 disposed at the fuselage to a tip 32, 34 disposed distal to the fuselage. In various embodiments, the HVAC system 100 is disposed at least partially within the fuselage 20. In this regard, the HVAC system 100 is configured to provide cooling air into a cabin of the fuselage 20 during operation of the aircraft 10 as described further herein. Although described as being in an aircraft 10, the HVAC system 100 is not limited in this regard. For example, the HVAC system 100 can be disposed in a building, a house, a commercial residence, a private residence, or the like and still be within the scope of this disclosure.

Figure 2:
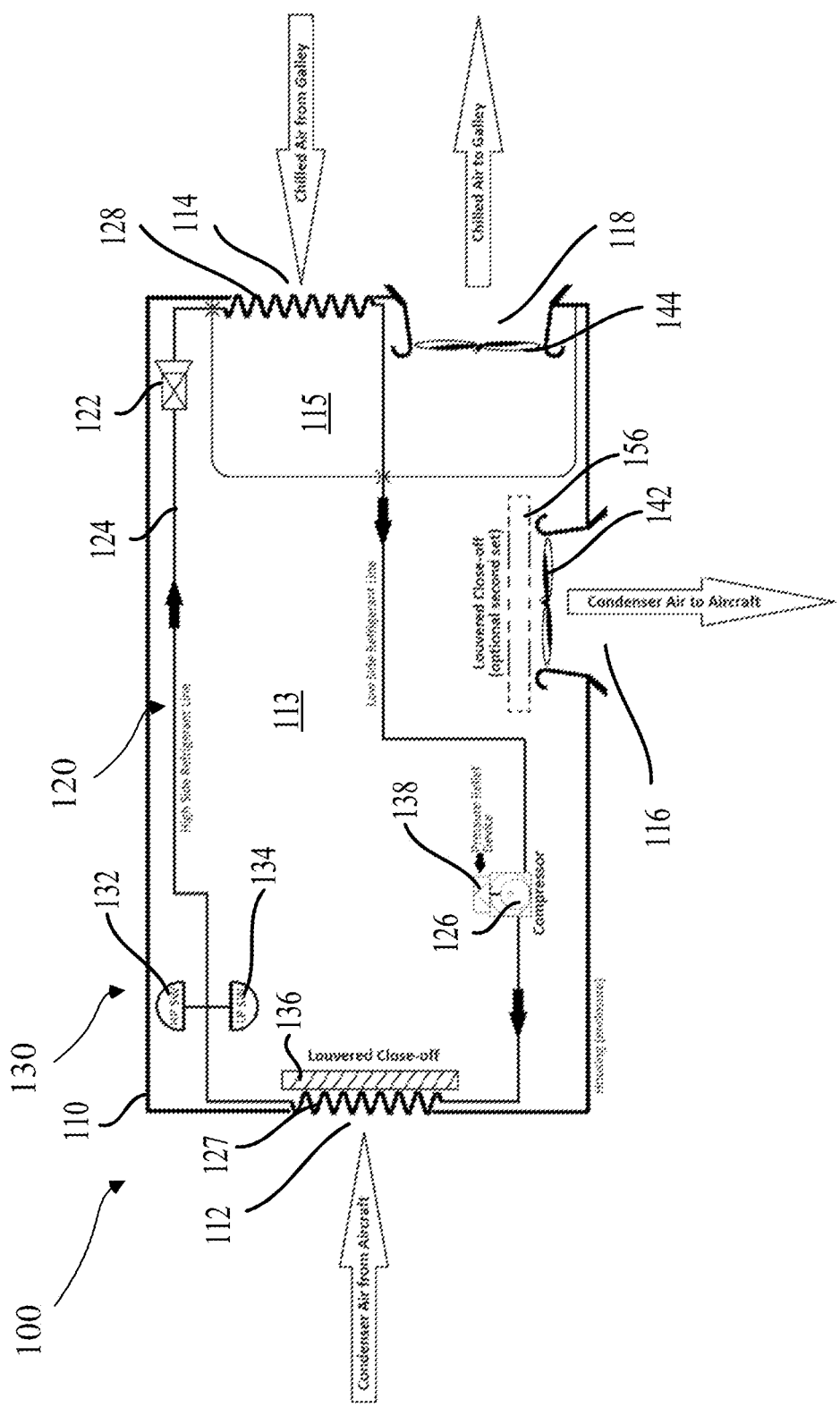
FIG. 2 illustrates a schematic view of an HVAC system, in accordance with various embodiments.

Referring now to FIG. 2, a schematic view of the HVAC system 100 is illustrated, in accordance with various embodiments. The HVAC system 100 comprises a housing 110, a plumbing system 120, a leakage protection system 130, and fans 142, 144. In various embodiments, the plumbing system 120 is disposed within the housing 110. The housing 110 defines inlet ports 112, 114 and outlet ports 116, 118. The plumbing system 120 comprises an expansion device 122, fluid conduits 124, a compressor 126, a condenser 127 and a heat exchanger 128. In various embodiments, the condenser 127 is disposed proximate the inlet port 112 and the heat exchanger 128 is disposed proximate the inlet port 114. The fan 142 is disposed within the outlet port 116 and the fan 144 is disposed within the outlet port 118.

In various embodiments, during operation of the HVAC system 100, air flows through the inlet port 112 (i.e., pulled in via the fan 142). In response to flowing through the inlet port 112, the refrigerant flows through the condenser 127, which adds heat to the airflow and thus heating the airflow. The heated airflow is then released out the outlet port 116 back to a cabin in the fuselage 20 of the aircraft 10 from FIG. 1. Similarly, chilled air from a galley of the aircraft 10 from FIG. 1 can be pulled through the inlet port 114 into a cavity 115 via the fan 144, and then released back into the galley through outlet port 118. In this regard, the air traveling through the inlet port 114 is cooled in a reverse manner to the airflow travelling through the inlet port 112.

In various embodiments, during operation, a refrigerant travels through plumbing system 120. In this regard, the refrigerant travels through the expansion device 122. The expansion device 122 controls an amount of refrigerant and rapidly reduces the refrigerant pressure and temperature released to an evaporator section of the plumbing system 120, in accordance with various embodiments. After going through the expansion device 122, the refrigerant travels through the heat exchanger 128 which transitions the refrigerant from a liquid state to a gas state in response to heat being absorbed from the chilled air coming from the galley of the aircraft 10 from FIG. 1. After traveling through the heat exchanger 128, the refrigerant, in the gas state, travels through the compressor 126 then upstream to the condenser 127. The compressor performs work on the refrigerant raising its pressure and temperature. Then the refrigerant travels through the condenser 127 where heat is removed from the refrigerant to condense it, and heat is transferred to the air entering the inlet port 112 by the refrigerant, which transitions back from the gas state into the liquid state.

In various embodiments, the refrigerant disposed in the plumbing system 120 comprises a low GWP refrigerant, such as hydrofluoroolefin ("HFOs"). In this regard, the refrigerant can be flammable. Accordingly, the leakage protection system 130 is configured to impede refrigerant leakage from the HVAC system 100, significantly reducing the refrigerant leakage rate to prevent or reduce leakage of the refrigerant from the housing 110 of the HVAC system while the HVAC system 100 is not in operation, or in response to the HVAC system 100 malfunctioning, as described further herein.

In various embodiments, the leakage protection system 130 comprises a high-pressure switch 132, a low-pressure switch 134, and a louvered assembly 136. In various embodiments, the louvered assembly 136 is coupled to the housing 110. With brief reference to FIGS. 4A and 4B, the louvered assembly 136 in an "open configuration" is illustrated, in accordance with various embodiments. In an open configuration, the slats 402 of the louvered assembly 136 are angled in a manner to fluidly couple an internal cavity 113 of the housing 110 to an external environment (e.g., a fluid conduit in fluid communication with the inlet port 112). In this regard, in the open configuration, the air from the aircraft can flow through the inlet port 112 into the cavity 113 and out the outlet port 116 as described previously herein. In various embodiments, as described further herein, the louvered assembly 136 is configured to be in an open state (i.e., the open configuration), during operation of the HVAC system 100. In this regard, the HVAC system 100 can operate normally.

In various embodiments, the high-pressure switch 132 and the low-pressure switch 134 are operably coupled to the fluid conduit 124 of the plumbing system. In various embodiments, the pressure switches 132, 134 are configured to be in a closed position during normal operation, as described further herein.

Figure 3:
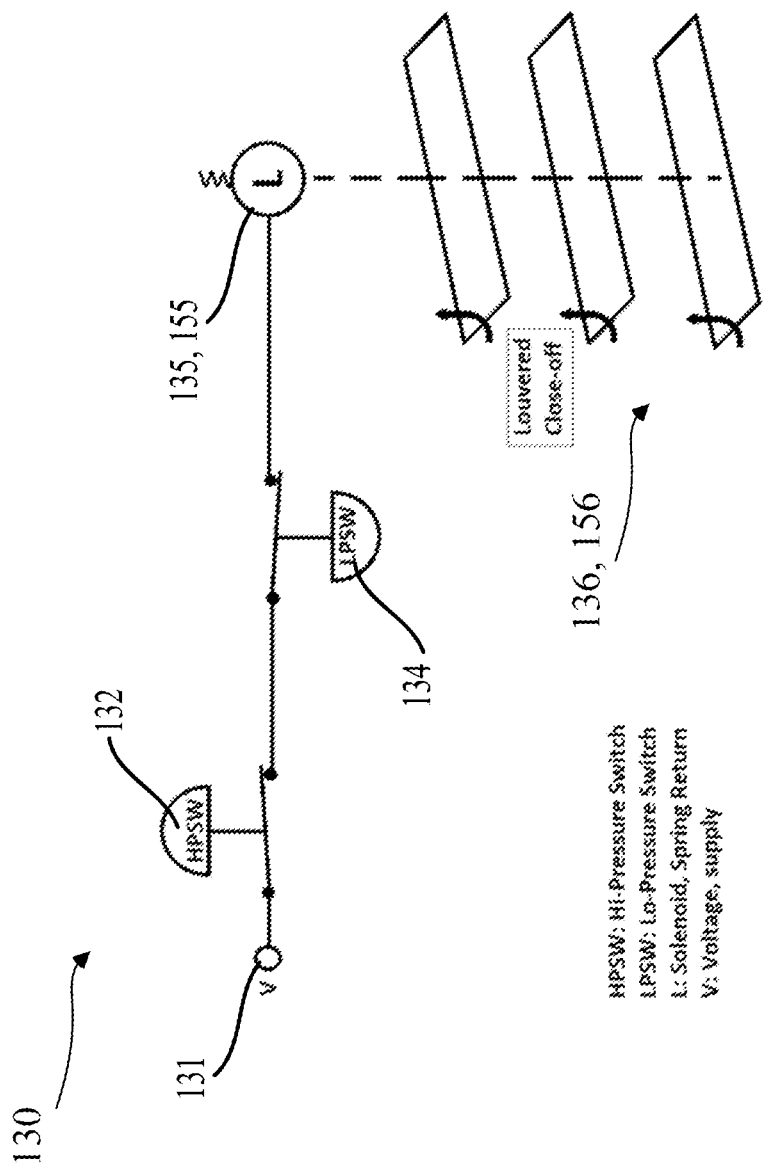
FIG. 3 illustrates a schematic view of a leakage protection system for an HVAC system, in accordance with various embodiments.

Referring now to FIG. 3, a schematic view of the leakage protection system 130 is illustrated, in accordance with various embodiments. In various embodiments, the leakage protection system 130 further comprises a power source 131 and a solenoid 135. In various embodiments, during typical operation of the HVAC system 100 from FIG. 2, the high-pressure switch 132 and the low-pressure switch 134 are in a closed position. In this regard, during typical operation of the HVAC system 100, the solenoid is electrically coupled to the power source 131. In response to the solenoid 135 being energized (i.e., in response to receiving a current from the power source 131), the solenoid actuates an actuator rod (e.g., actuator rod 406 from FIG. 4B), which compresses a spring (e.g., spring 404 from FIG. 4B). In response to the actuator rod 406 translating linearly, the slats 402 of the louvered assembly 136 (as shown in FIG. 4A) transition from a closed configuration into the open configuration.

Figure 4:
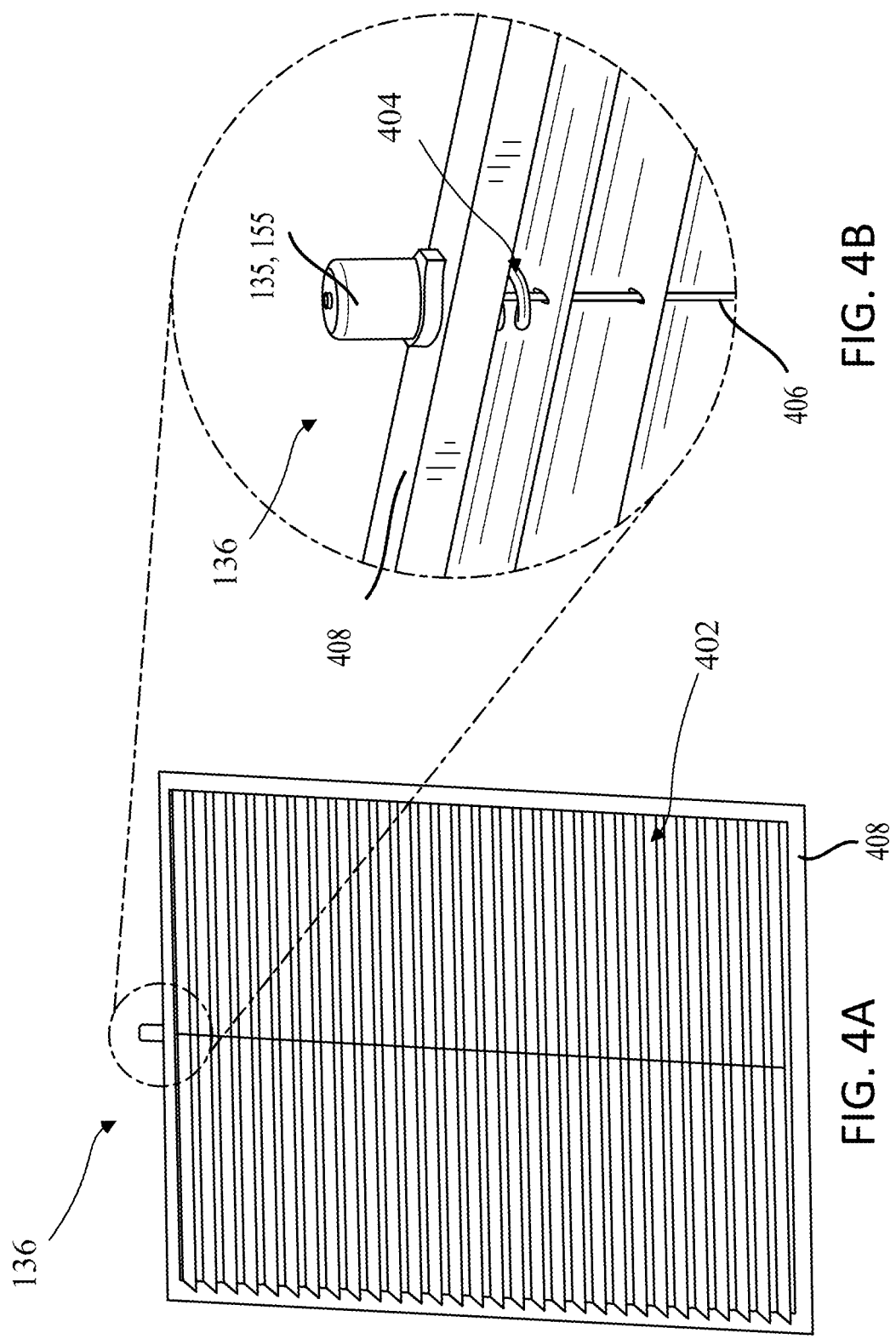
FIG. 4A illustrates a louvered assembly for use in an HVAC system, in accordance with various embodiments.
FIG. 4B illustrates a detailed view of a portion of the louvered assembly of FIG. 4A in accordance with various embodiments.

In various embodiments, in response to the power source 131 being electrically de-coupled from the solenoid 135, the solenoid 135 becomes de-energized, and the spring 404 from FIG. 4B returns the slats 402 of the louvered assembly 136 to a closed configuration. A "closed configuration" as referred to herein is a configuration where each slat in the slats 402 of the louvered assembly 136 from FIG. 4A overlaps an adjacent slat in the slats 402 of the louvered assembly 136. In this regard, with reference back to FIG. 2, the cavity 113 within the housing 110 becomes fluidly obstructed from the fluid conduit providing the air through the inlet 112. In this regard, if refrigerant is leaking within the cavity 113 within the housing 110, the refrigerant vapor flow rate is impeded reducing the amount of refrigerant which can escape through the inlet port 112 and housing 110, in accordance with various embodiments.

With continued reference to FIG. 2, in accordance with various embodiments, the leakage protection system 130 can further comprise a second louvered assembly 156 disposed proximate the outlet port 116. In this regard, the second louvered assembly 156 can be configured to fluidly impede or isolate an external environment proximate the outlet port 116 from the internal cavity 113 in a similar manner to the louvered assembly 136, in accordance with various embodiments. In various embodiments, although illustrated as being at a lower side of the HVAC system 100, the outlet port 116 can be aligned in an upward direction. In this regard, leakage from the outlet port 116 can potentially be prevented without a second louvered assembly 156 via gravity as opposed to a second louvered assembly 156, in accordance with various embodiments. The present disclosure is not limited in this regard.

In various embodiments, the louvered assembly 156 is in accordance with the louvered assembly 136. In various embodiments, the louvered assembly 156 is coupled to the housing 110. In various embodiments, the louvered assembly 156 is operably coupled to the power source 131, the high-pressure switch 132, the low-pressure switch 134, and a solenoid 155 as shown in FIG. 3. In this regard, in a dual louvered assembly embodiment, both louvered assemblies 136, 156 can be operably coupled to the power source 131, the high-pressure switch 132, and the low-pressure switch 134, in accordance with various embodiments.

In various embodiments, the leakage protection system 130 further comprises a pressure relief device 138 coupled to the compressor 126. In various embodiments, the pressure relief device 138 is configured to release pressure from the plumbing system 120 in response to a pressure exceeding a pressure threshold in the plumbing system 120. For example, in response to the pressure in the fluid conduits 124 exceeding 350 pounds per square inch (psi), the pressure relief device 138 can begin to release the pressure from the plumbing system 120. In various embodiments, the pressure relief device 138 comprises a burst disk. A "burst disk" as disclosed herein is a disk that covers a fluid outlet and is configured to burst in response to a pressure experienced by the burst disk exceeding a pressure threshold.

In various embodiments, the leakage protection system 130 comprises at least one of the pressure relief device 138, the louvered assembly 136, and the louvered assembly 156. In this regard, the pressure relief device 138, the louvered assembly 136, and the louvered assembly 156 each comprise various benefits for reducing pressure and preventing leakage or reducing leakage rate to remain below flammable air mixture limits of a refrigerant due to a malfunction or after shutting down of the HVAC system 100.

Referring now to FIGS. 4A and 4B, a perspective view of a louvered assembly 136, 156 in an open position (FIG. 4A) and a detail view of a portion of the louvered assembly 136, 156 (FIG. 4B) are illustrated, in accordance with various embodiments. In various embodiments, the louvered assembly 136, 156 comprises a frame 408 at least partially defining a perimeter of the louvered assembly 136, 156. In various embodiments, the frame 408 can be coupled to a housing (e.g., housing 110) of an HVAC system 100 by any method known in the art (e.g., fasteners or the like). In various embodiments, slats 402 are spaced apart in a vertical direction, though not limited to any other orientation, within the frame 408 and operably coupled to the actuator rod 406. In various embodiments, the actuator rod 406 can be configured to twist or translate. The present disclosure is not limited in this regard. In various embodiments, the actuator rod is configured to transition the slats 402 from an open position (i.e., where adjacent slats in the slats 402 have an opening therebetween) to a closed position (i.e., where adjacent slats in the slats 402 abut each other fluidly decoupling a first side of the louvered assembly 136, 156 from a second side of the louvered assembly 136, 156.

In various embodiments, the solenoid 135, 155 is operably coupled to the actuator rod 406 and coupled to the frame 408. The solenoid 135, 155 is configured to be electrically coupled to the pressure switches 132, 134 and the power source 131 described previously herein during normal operation. In this regard, the solenoid 135, 155 is configured to bias the actuator rod 406 in a manner that causes the spring 404 to compress, and the slats 402 into an open configuration as described previously herein. In response to being de-energized (e.g., in response to a pressure switch 132, 134 transitioning from a closed position to an open position), the actuator rod 406 is returned to a default position (i.e., where the slats 402 are closed), in accordance with various embodiments.

Figure 5:
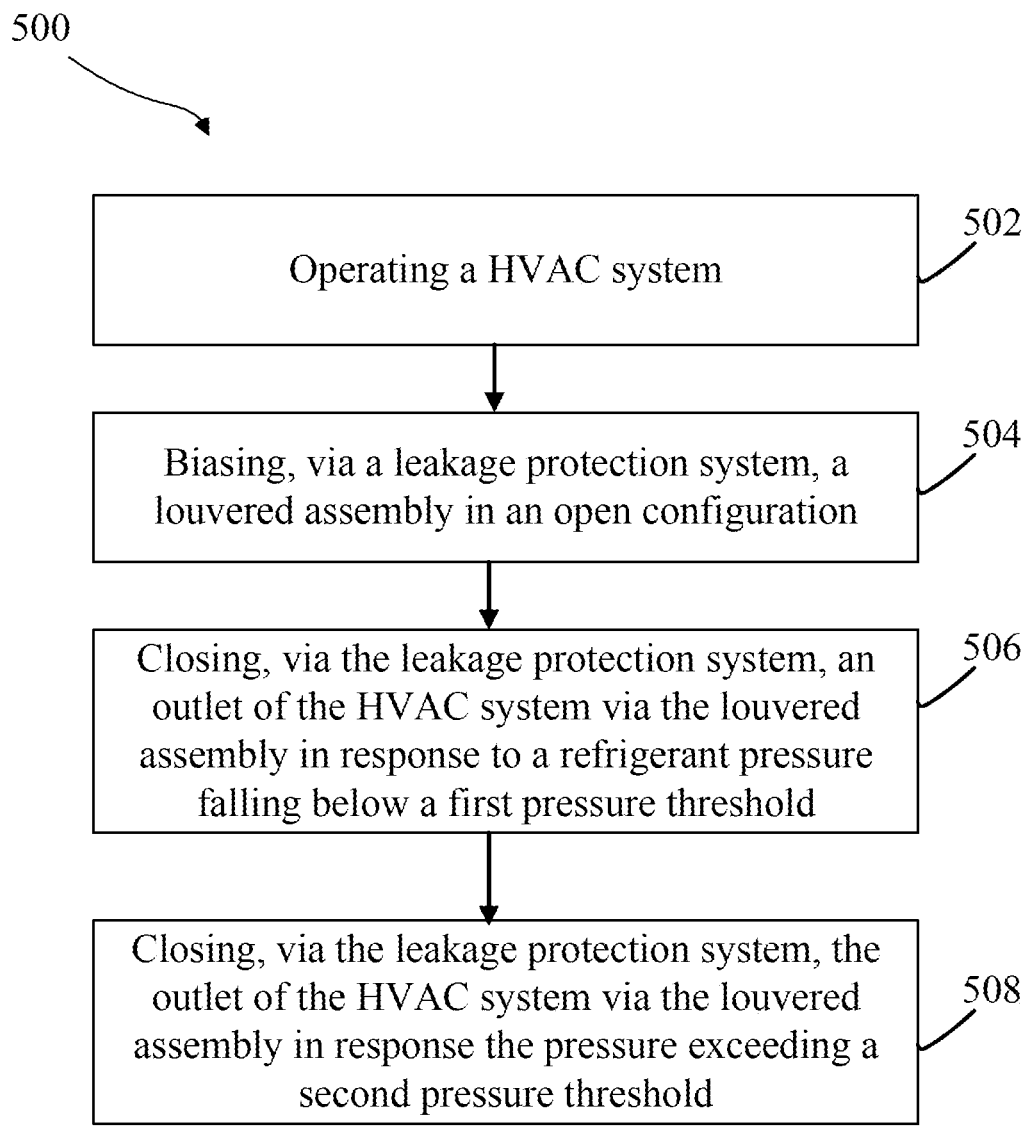
FIG. 5 illustrates a method of use for a leakage protection system of an HVAC system, in accordance with various embodiments.

Referring now to FIG. 5, a method of operating a leakage protection system 130 for an HVAC system 100 is illustrated, in accordance with various embodiments. The method 500 comprises operating an HVAC system 100 (step 502). In response to operating the HVAC system 100 from FIG. 2, a refrigerant travels through the fluid conduits 124 of the plumbing system 120, supplying an operating pressure within the fluid conduits 124. In various embodiments, the method 500 further comprises biasing, via a leakage protection system, a louvered assembly 136, 156 into an open configuration in response to the operating pressure being within a predetermined range (e.g., between a first pressure threshold and a second pressure threshold) (step 504). In various embodiments, the first pressure threshold is meant to trip the leakage activation system in response to refrigerant leaking out of fluid conduits 124 which reduces the refrigerant pressure sensed within fluid conduit 124 as an abnormal condition. Refrigerant pressure will always be above the first pressure threshold independent of HVAC system 100 operating state being ON or OFF under normal conditions. In various embodiments, the second pressure threshold is meant to identify a malfunctioning condition where the pressure in the fluid conduits 124 exceeds the second pressure threshold. In various embodiments, the first pressure threshold can be approximate 15 pounds per square inch (psig). In various embodiments, the second pressure threshold can be approximately 350 psig. However, the present disclosure is not limited in this regard.

The method 500 further comprises closing, via the leakage protection system 130, an outlet port of the HVAC system 100 via a louvered assembly in response to a refrigerant operating pressure falling below the first pressure threshold (step 506). In various embodiments, the louvered assembly 136, 156 is closed in response to a solenoid coupled to the louvered assembly 136, 156 being de-energized as described previously herein.

The method 500 further comprises closing, via the leakage protection system, the outlet port of the HVAC system 100 via the louvered assembly in response to the pressure exceeding the second pressure threshold (step 508). In this regard, in response to an operating pressure becoming too high and potentially creating a scenario where the fluid conduits 124 of the plumbing system 120 could break, leakage of the refrigerant outside of the housing 110 of the HVAC system 100 can be prevented, in accordance with various embodiments. In various embodiments, in response to a high-pressure situation, a pressure relief device of the compressor in the HVAC system 100 can be activated (e.g., a burst duct could burst) providing relief of pressure in the fluid conduits 124, in accordance with various embodiments.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A leakage protection system for a heating, ventilation, and air condition (HVAC) system, the leakage protection system comprising:
 a power source;
 a louvered assembly including a frame, slats spaced apart vertically within the frame and extending from a first side to a second side of the frame, an actuator rod operably coupled to the slats, and a spring;
 a solenoid operably coupled to the actuator rod;
 a first pressure switch disposed electrically between the power source and the solenoid, wherein the first pressure switch is configured to open in response to an operating pressure in a fluid conduit of the HVAC system falling below a first pressure threshold; and
 a second pressure switch disposed electrically between the first pressure switch and the power source, wherein the second pressure switch is configured to open in response to the operating pressure in the fluid conduit of the HVAC system exceeding a second pressure threshold.

2. The leakage protection system of claim 1, wherein the solenoid is de-energized in response to at least one of the first pressure switch opening or the second pressure switch opening.

3. The leakage protection system of claim 2, wherein the louvered assembly is configured to transition from an open configuration to a closed configuration in response to the solenoid being de-energized.

4. The leakage protection system of claim 3, wherein the spring transitions the louvered assembly from the open configuration to the closed configuration in response to the solenoid being de-energized.

5. The leakage protection system of claim 3, wherein the actuator rod is configured to bias the slats into the open configuration during operation of the HVAC system, and wherein the spring is compressed in response to the actuator rod biasing the slats into the open configuration.

6. A heating, ventilation, and air condition (HVAC) system, comprising:
 a housing defining an inlet port;
 a power source;
 a plumbing system disposed in the housing, the plumbing system including a fluid conduit configured to flow a refrigerant therethrough during operation, the plumbing system including a condenser disposed proximate the inlet port;
 a first pressure switch operably coupled to the plumbing system;
 a second pressure switch operably coupled to the plumbing system;
 a first louvered assembly disposed proximate the inlet port; and
 a first solenoid operably coupled to the first louvered assembly, the first pressure switch disposed electrically between the power source and the first solenoid, the second pressure switch disposed electrically between the first pressure switch and the power source, wherein the first pressure switch is configured to open in response to an operating pressure in a fluid conduit of the HVAC system falling below a first pressure threshold and wherein the second pressure switch is configured to open in response to the operating pressure in the fluid conduit of the HVAC system exceeding a second pressure threshold.

7. The HVAC system of claim 6, further comprising a second louvered assembly, wherein the housing further defines an outlet port, and wherein the second louvered assembly is disposed proximate the outlet port.

8. The HVAC system of claim 7, further comprising a second solenoid operably coupled to the second louvered assembly, wherein the first pressure switch is disposed electrically between the second solenoid and the power source and wherein the second pressure switch is disposed electrically between the first pressure switch and the power source.

9. The HVAC system of claim 8, wherein the first louvered assembly and the second louvered assembly are both configured to transition from an open configuration to a closed configuration in response to at least one of the first pressure switch or the second pressure switch opening.

10. The HVAC system of claim 9, wherein the first solenoid and the second solenoid are de-energized in response to at least one of the first pressure switch or the second pressure switch opening.

11. The HVAC system of claim 6, further comprising a compressor coupled to the fluid conduit, the condenser disposed upstream of the compressor, a heat exchanger disposed downstream of the compressor, and an expansion device disposed fluidly between the condenser and the heat exchanger, wherein a pressure relief device is coupled to the compressor.

12. A method of operating a leakage protection system, comprising:
 biasing, via the leakage protection system, a louvered assembly into an open configuration in response to an operating pressure of a fluid conduit in a heating, ventilation, and air condition (HVAC) system being between a first pressure threshold and a second pressure threshold;
 responsive to a first pressure switch disposed electrically between a power source and a solenoid coupled to the louvered assembly detecting the operating pressure of the fluid conduit falling below the first pressure threshold and opening, closing, via the leakage protection system, the louvered assembly; or
 responsive to a second pressure switch disposed electrically between the first pressure switch and the power source detecting the operating pressure of the fluid conduit exceeding the second pressure threshold and opening, closing, via the leakage protection system, the louvered assembly.

13. The method of claim 12, wherein closing the louvered assembly further comprises:
 de-energizing the solenoid operably coupled to an actuator rod of the louvered assembly; and
 closing the louvered assembly via a spring in response to the solenoid being de-energized.

* * * * *